United States Patent
Cronce et al.

(10) Patent No.: US 7,124,445 B2
(45) Date of Patent: Oct. 17, 2006

(54) PROTECTING SOFTWARE FROM UNAUTHORIZED USE BY CONVERTING SOURCE CODE MODULES TO BYTE CODES

(75) Inventors: Paul A. Cronce, San Jose, CA (US); Joseph M. Fontana, San Jose, CA (US); Eric C. Anderson, San Jose, CA (US)

(73) Assignee: PACE Anti-Piracy, Inc., San Jose, CA (US)

( * ) Notice: Subject to any disclaimer, the term of this patent is extended or adjusted under 35 U.S.C. 154(b) by 739 days.

(21) Appl. No.: 10/177,499

(22) Filed: Jun. 21, 2002

(65) Prior Publication Data

US 2003/0236986 A1    Dec. 25, 2003

(51) Int. Cl.
  *G06F 17/30*    (2006.01)
  *G06F 11/30*    (2006.01)
  *G06F 9/44*    (2006.01)
  *G06F 9/45*    (2006.01)

(52) U.S. Cl. .................... 726/26; 713/189; 717/110; 717/136; 717/139

(58) Field of Classification Search ............. 717/124, 717/126, 118, 154, 167; 709/203; 714/39; 713/151, 161, 187, 192, 189, 190
See application file for complete search history.

(56) References Cited

U.S. PATENT DOCUMENTS

| | | | | |
|---|---|---|---|---|
| 5,768,596 A * | 6/1998 | Chow et al. | ............... | 717/154 |
| 6,282,698 B1 * | 8/2001 | Baker et al. | ............... | 717/118 |
| 6,374,402 B1 * | 4/2002 | Schmeidler et al. | ........ | 717/167 |
| 6,467,052 B1 * | 10/2002 | Kaler et al. | ................... | 714/39 |
| 6,594,761 B1 * | 7/2003 | Chow et al. | ................. | 713/190 |
| 6,609,201 B1 * | 8/2003 | Folmsbee | .................... | 713/187 |
| 6,657,961 B1 * | 12/2003 | Lauffenburger et al. | .... | 370/231 |
| 6,704,871 B1 * | 3/2004 | Kaplan et al. | ............... | 713/192 |
| 6,708,273 B1 * | 3/2004 | Ober et al. | ................. | 713/189 |
| 6,742,177 B1 * | 5/2004 | Dorak et al. | ................ | 717/124 |
| 6,763,370 B1 * | 7/2004 | Schmeidler et al. | ........ | 709/203 |
| 6,862,683 B1 * | 3/2005 | Wille et al. | ................. | 713/151 |
| 6,922,782 B1 * | 7/2005 | Spyker et al. | .............. | 713/161 |

* cited by examiner

*Primary Examiner*—Antony Nguyen-Ba
(74) *Attorney, Agent, or Firm*—Stephen G. Sullivan; Strategic Patent Group, P.C.

(57) ABSTRACT

A method for anti-piracy protection of a software application by obfuscation of the execution of portions of the applications code is described. The method comprises providing a language specification and library to implement the functions of the language, providing a compiler to translate the language into byte codes, and providing an interpreter to execute the byte codes using the library. The method further comprises providing the language specifications, library, compiler, interpreter, and instructions to a software publisher, wherein the software publisher embeds the library and interpreter in the application to be protected, and selects and prepares application code segments for processing into byte codes by the compiler. The application is then executed using the embedded library and interpreter, wherein the execution of the application is obfuscated by the use of byte codes.

A further aspect of the invention is to provide the compiler, interpreter, and library functions on a secure server, giving the language specification and only limited instructions to the publisher for preparation of the application for protection processing, for the purpose of preventing a hacker from studying the operation of the toolset.

9 Claims, 13 Drawing Sheets

PROTECTING SOFTWARE FROM UNAUTHORIZED USE BY CONVERTING SOURCE CODE MODULES TO BYTE CODES

FIELD OF THE INVENTION

The present invention relates to anti-piracy protection for software applications, and more particularly to obfuscating the execution path of a software application by using a byte code interpreter to implement portions of the application code.

BACKGROUND OF THE INVENTION

Software licensing and anti-piracy protection has been used for some time in the software industry as a means of controlling use of software, and more particularly, for the purpose of limiting or eliminating unauthorized use of software, known as software piracy.

The resulting economic dislocation that occurs due to software piracy is severe. As the cost of developing and supporting software programs increases, the need to reduce piracy grows. One of the key elements of reducing software piracy is through the use of an electronic software license, delivered to the authorized user to enable the software program to operate. The electronic license includes the required information in a form that is understood by the software program, and contains license terms.

License terms are the terms that apply to the use of the particular copy of the software program, and can include a start date, an end date, a number of program launches, fingerprint information to limit use on a specific local area network or on a specific machine, and other controlling information. For increased security, the electronic software license may be encrypted to hamper hacker efforts to bypass its function. This requires that the software program contain a decryption key to decrypt the license before extracting the information required.

One of the limitations of typical machine fingerprinting solutions is that the accessing of the fingerprint information and the determination of a correct, match is completed during the protection phase prior to the execution of the main application. Thus, if the application can be separated from the protection wrapper, it will execute correctly on any machine.

In addition to license files, other anti-piracy tools have been employed. These tools typically are used to add various types of authentication to the program being protected, such as decryption, checksum validation, and overriding various debug mechanisms in the operating system and hardware. All of these and other techniques were created for the purpose of making it difficult for a software hacker to break into the application code and remove it from its protection "wrapper" so it can be provided free of any license terms at no cost or very low cost, and where the software publisher receives no payment of any kind for its use. The process of adding protection software to a software application is often referred to as "wrapping." Wrapping tools are typically sold to software developers who then perform the wrapping process on each software program prior to shipping the software to customers.

Since the runtime environment for the software program and its protection wrapper is typically unprotected, such as with Microsoft Corporation's Windows Operating System, and since a large number of programmers have extensive knowledge of programming on such a system, it is difficult to effectively protect software running on such machines. In addition to having extensive knowledge of the operating environment, hackers also can purchase or "borrow" a copy of the protection-wrapping tool. By studying the operation of the tool, the hacker gains a much deeper understanding of the protection mechanisms and techniques used by the tool than by studying only the resulting protected software, reducing the work required to compromise a given protected software product. In fact, the level of difficulty for breaking protected code without this additional aid is sufficiently high that most hackers will take great pains to acquire a copy of the protection tool for the purpose of studying its operation. Thus, it is extremely important to protect the wrapping tool itself. Otherwise, if the tool finds its way into the wrong hands, the security of every program wrapped for protection by the tool is at a substantially higher risk of being compromised.

Many of the techniques described above use encryption and debugging suppression features, often requiring kernel-level drivers to implement successfully and clandestinely. Unfortunately, this technique of using kernel-level drivers is susceptible to driver architecture changes and system configuration variations, and thus requires a high level of customer support. While the level of support required is reasonable for a small market, large markets cannot tolerate the support costs, and require other solutions.

Accordingly, what is needed is a method for obfuscation of program execution without using kernel level drivers, to make it difficult for a hacker to determine what work is being done by the application and its protection logic. Additionally, what is needed is a means of providing the toolset in a secure environment to eliminate the opportunity for studying the tool processing method, and thereby increasing the security of the protection. The present invention addresses such a need.

SUMMARY OF THE INVENTION

The present invention provides a method for anti-piracy protection of a software application by obfuscation of the execution of portions of the applications code. The method comprises providing a language specification and library to implement the functions of the language, providing a compiler to translate the language into byte codes, and providing an interpreter to execute the byte codes using the library. The method further comprises providing the language specifications, library, compiler, interpreter, and instructions to a software publisher, wherein the software publisher embeds the library and interpreter in the application to be protected, and selects and prepares application code segments for processing into byte codes by the compiler. The application is then executed using the embedded library and interpreter, wherein the execution of the application is obfuscated by the use of byte codes, since such execution cannot be analyzed by a debugger.

A further aspect of the invention is to provide the compiler, interpreter, and library functions on a secure server as a toolset, and giving the language specification and only limited instructions to the publisher to prepare the application for protection processing by the toolset on the secure server to make it more difficult for a hacker to gain access to the toolset and stud the operation of the toolset.

According to the system and method disclosed herein, the present invention obfuscates the execution of the application being protected, making it difficult for hackers to determine the execution path for the purpose of hacking the application to remove anti-piracy mechanisms.

DETAILED DESCRIPTION

The present invention relates to a method and system for anti-piracy protection for a software application. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown but is to be accorded the widest scope consistent with the principles and features described herein.

Figure 1:
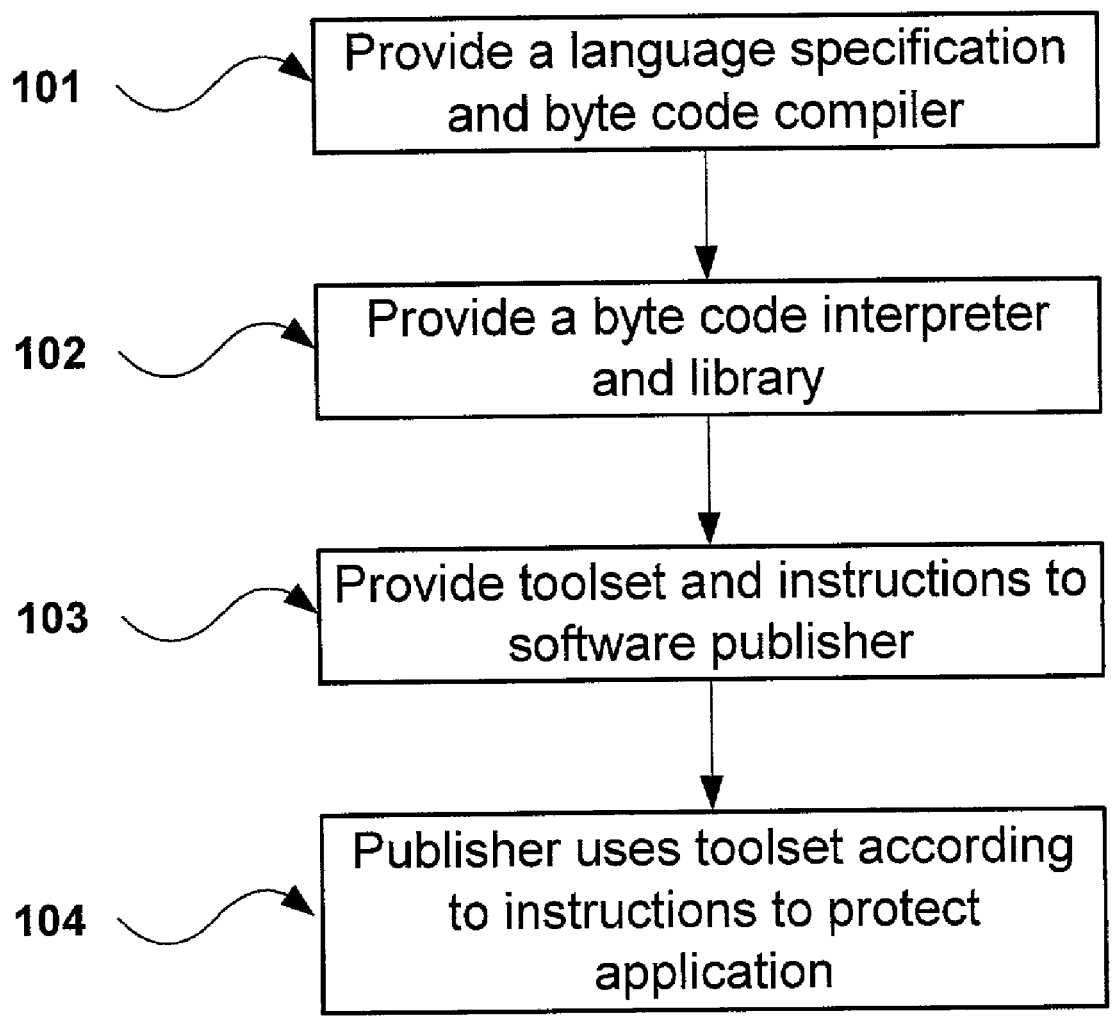
FIG. 1 is a flow diagram of the process of protecting an application using the present invention.

Referring to FIG. 1, a flow diagram of the process of protecting an application using the present invention is shown. In step 101, a language specification and corresponding byte code compiler is provided. The language specification describes the language syntax and functionality, and may be a subset or extension of a well-known language, such as a C language extension. The compiler recognizes the described language syntax, and compiles the language into byte codes in the format required for interpretation by a byte code interpreter. In step 102, the byte code interpreter is provided for this purpose, along with a library used to implement the internal functions of the interpreter. Note that the interpreter and library may be provided as a single unit rather than in two separate pieces.

In step 103, a toolset comprising the interpreter, library, compiler, and language specification is provided to a software publisher, along with instructions on how to use the toolset to provide protection from hackers. It is important to note that the elements in the first two steps, steps 101 and 102, can be placed in any order without changing the outcome of the process depicted. In effect, steps 101 and 102 define the components of the toolset provided to the publisher in step 103. In step 104, the publisher uses the toolset as instructed to protect an application program. More particularly, selected portions of the compiled program are run through the toolset to convert the code from compiled native code to interpreted byte code, which hides those portions of code from debuggers during program execution.

Effectively, steps 101, 102, and 103 comprise the creation of a toolset for processing portions of application code in a non-standard manner that would otherwise be processed in a standard way. The standard way comprises the use of off-the-shelf compilers, for standard languages such as C and C++ for example. The compiled results are well known and understood by most hackers and programmers alike, to the extent that by looking at the compiled code using a memory analyzer or execution trace analyzer, the source code can be readily inferred, and therefore, the operation of the program can be readily understood. By processing the source code in a non-standard way, into unfamiliar, more convoluted code, this readily accessible path to understanding the application program operation is cut off, thereby affording some level of protection from hackers.

Figure 2:
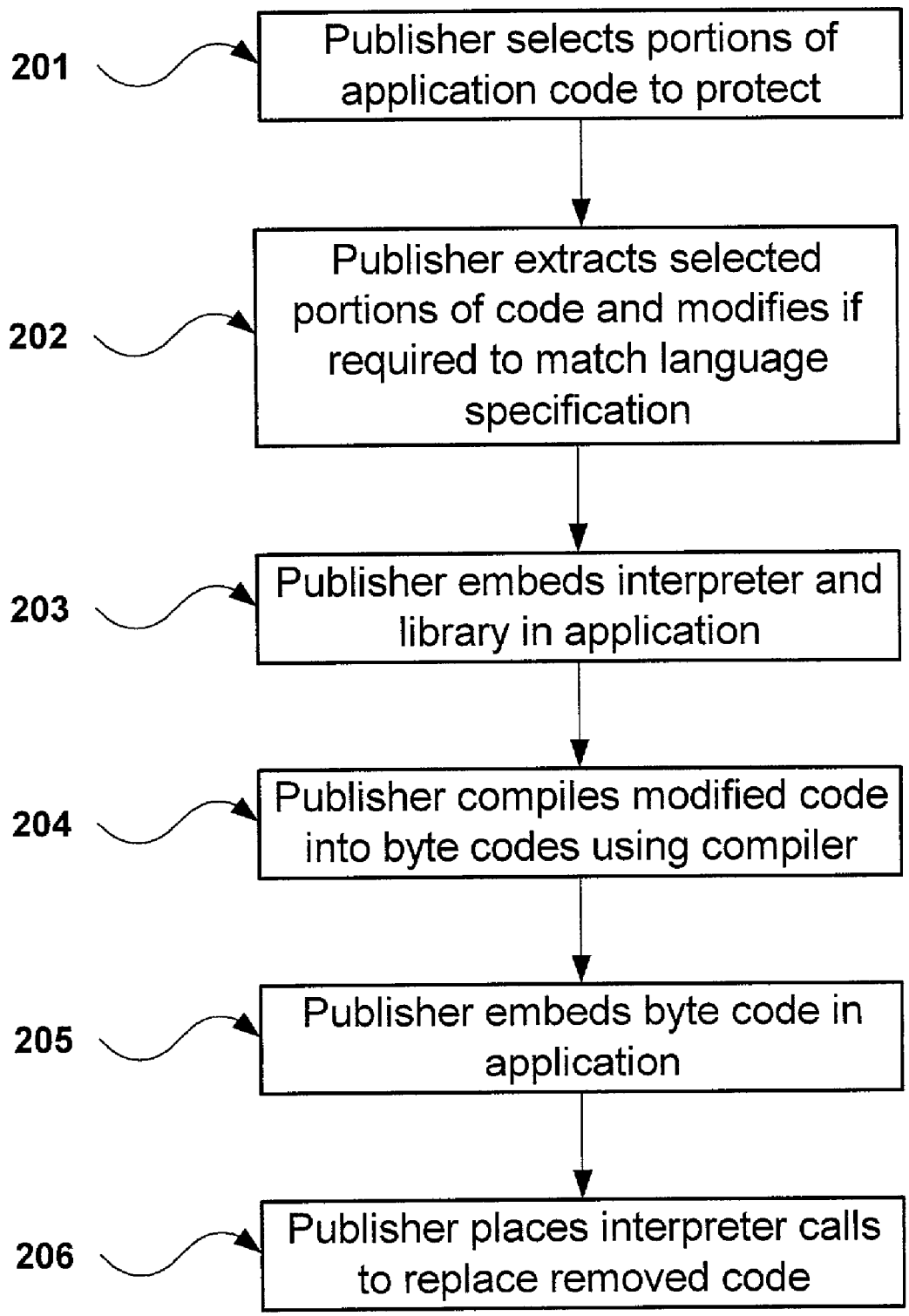
FIG. 2 is a flow diagram showing how a software publisher uses the toolset provided according to the present invention.

Referring to FIG. 2, a flow diagram showing how a software publisher uses the toolset provided according to the present invention is shown. In step 201, the publisher selects portions of the application code to protect with the provided toolset. There are many criteria that can be applied in this selection process, and it strongly depends on the type of application, and what the publisher is trying to protect within the application.

One common area of an application that benefits from this type of protection is the DRM (digital rights management) code. The DRM typically deals with licenses, license terms, machine fingerprints, digital certificates, security keys, and other means of controlling the use of the application. The DRM code contains logic processing code and mathematical functions, such as encryption/decryption algorithms, message digest algorithms, compression/decompression algorithms, or other security processing functions. The key component of the DRM for any given application is typically the logic processing, not the mathematical functions themselves. Typically, standard mathematical functions are used in order to benefit from tested and established security algorithms. Thus, the DRM logic processing code is a good candidate for obfuscation using this invention.

Another candidate for obfuscation using this invention is any code that is present in the application that is proprietary in nature, and represents significant value. In this case, the purpose for obfuscation is to retain exclusive use of the method employed by the code being protected. In effect, by obfuscation of the proprietary code, the owner can extend the timeframe of exclusive use, before a hacker can extract the method employed, and use it in a competing program. Clearly, it is the publisher who is most familiar with the application, and is most familiar with what constitutes the significant value that requires protection.

A key factor in selecting the code to be protected is the required processing speed. Conversion of a code module from compiled native code to interpreted byte code represents typically a decrease in execution performance by a factor of 10 or more. Thus, is it important to not select a code module with high CPU cycle requirements for obfuscation, but rather to select a critical logic section that does not represent a significant processing area, and is not part of a highly utilized loop. Otherwise, the overall performance of the application can be seriously impacted when using the technique of the present invention.

Once the publisher has selected the portions of application code to be protected, the process proceeds to step 202, where the publisher extracts the selected portions of code from the application, and modifies the code, if required by the provided language specification. Ideally, the language specification defines a language similar to the language being used for the application code, or represents a subset or extension thereof. In these cases, the modifications may be minimal, or no modifications may be required at all.

In step 203, the publisher embeds the interpreter and library in the application. In step 204, the extracted and modified code portions are compiled into byte codes, using the provided byte code interpreter and instructions. In step 205, the byte codes generated by the compiler are also embedded in the application. In step 206, interpreter calls are placed at the location of the removed portions in the application.

Step 205 and 206 can be accomplished in a number of different ways. In one embodiment, the compiler generates a call to the interpreter at the beginning of each byte code module in the native instruction set of the target processor. In this case, the byte code module is placed in the application as a data segment at the same location the original portion of code was taken from. When the execution path lands on the inserted block, the interpreter call begins the interpretation of the following byte codes. When the last byte code has been interpreted, control returns to normal machine instruction processing immediately after the byte code segment.

In the preferred embodiment of step 205 and 206, the byte code can be located anywhere in the application, and does not contain any native instructions. Rather, a standard function call to the interpreter is placed where the code portion was removed, along with a symbolic label identifying the entry point of the byte code generated for the code portion. The byte code, along with the identifying label, is located anywhere within the application, and is linked to the function call by the normal process of preparing the application executable. These techniques are well known by one of ordinary skill in the art, and will not be discussed in more detail herein.

The advantage of the preferred embodiment method for embedding the byte code is that a fixed size block can be created for insertion where each selected portion of code was removed, and the byte code can be appended to the end of the application, along with the interpreter and library. This means that the process of generating protected applications can be completely automated. This method will be described in detail in conjunction with FIG. 10 below.

It should be noted that the order of the steps in FIG. 2 is not absolute. For example, step 203 can be relocated anywhere in the process without changing the outcome of the process depicted. Likewise, step 206 can be placed anywhere after step 202 without changing the outcome of the process depicted.

Figure 3:
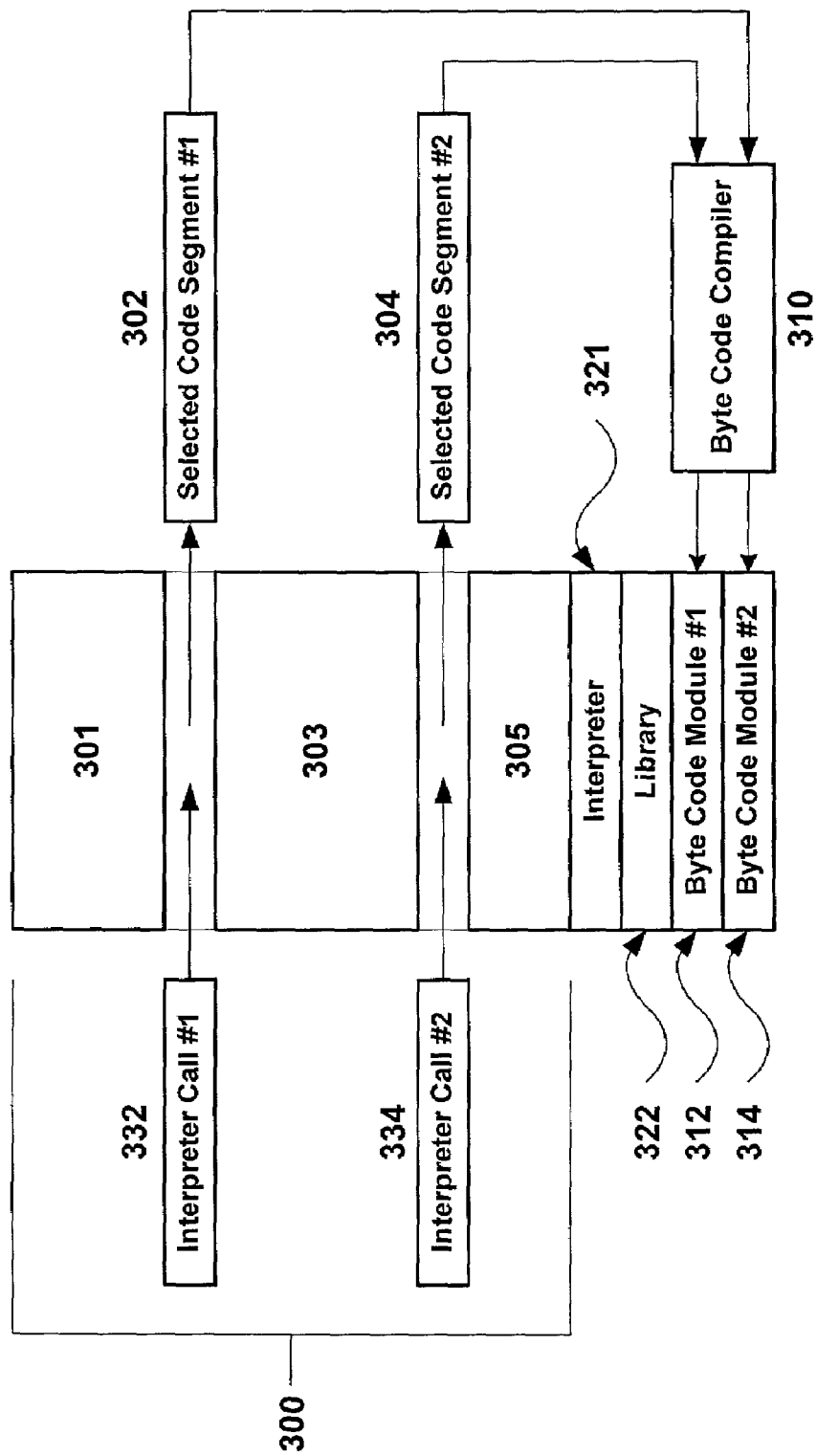
FIG. 3 is a block diagram of the protected application showing all components required for protection according to the present invention.

Referring to FIG. 3, a block diagram of the protected application showing all components required for protection according to the present invention is shown. Blocks 301, 302, 303, 304, and 305 represent the original, unprotected application 300. While the present invention allows any number of blocks to be selected, in the example shown in FIG. 3, only two portions of code are selected. The selected portions include blocks 302 and 304. These blocks are removed, and replaced by interpreter call #1 332 and interpreter call #2 334, respectively. The interpreter 321 and library 322 are appended to the end of the application. The removed blocks 302 and 304, after any required modifications to comply with the compiler 310 language specification, are compiled into byte codes, shown as blocks 312 and 314, respectively. The byte code modules 312 and 314 are then located at the end of the application, as shown. The ordering of the blocks 321, 322, 312, and 314 is not critical: any ordering can be used. Also, these blocks can be located at any convenient location within the application, or even at multiple locations, if desired. The resulting protected application then includes the original application code blocks 301, 302, and 303, along with the interpreter call blocks 332 and 334, and the four modules, 321, 322, 312, and 314.

Figure 4:
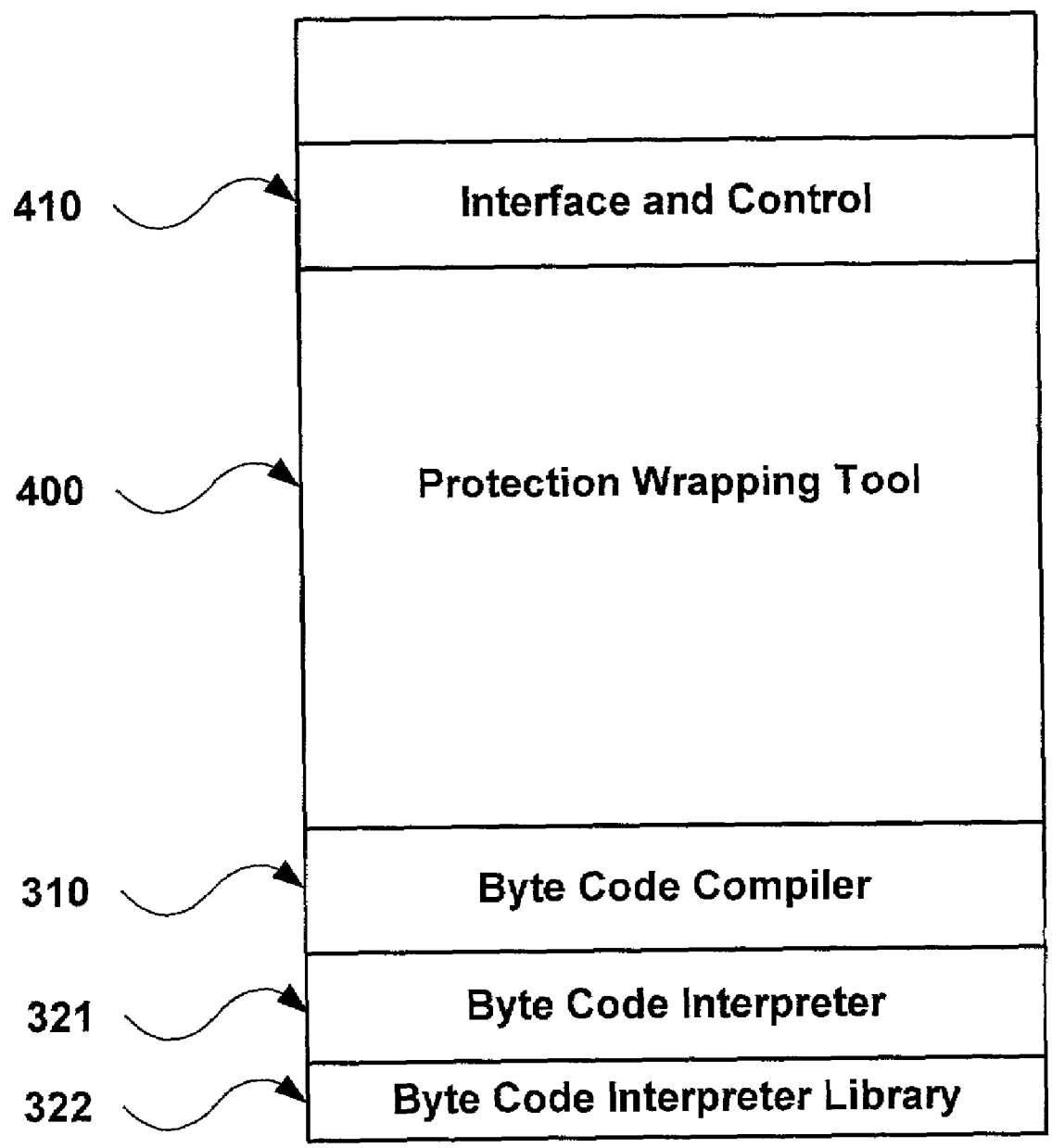
FIG. 4 is a block diagram of an anti-piracy wrapping tool including the toolset of the present invention.

Referring to FIG. 4, a block diagram of an anti-piracy wrapping tool including the toolset of the present invention is shown. The protection-wrapping application 400 includes the byte code compiler 310, byte code interpreter 321, and library 322. These modules may be included within the protection-wrapping toolset 400 as shown, or be external libraries called by the toolset 400. Also required is an interface and control module 410. This module or set of modules is required to implement the interaction between the publisher and the toolset 400 for the purpose of specifying the location of all selected code portions and related locations within the application, and managing the process of applying the protection of the present invention.

Figure 5:
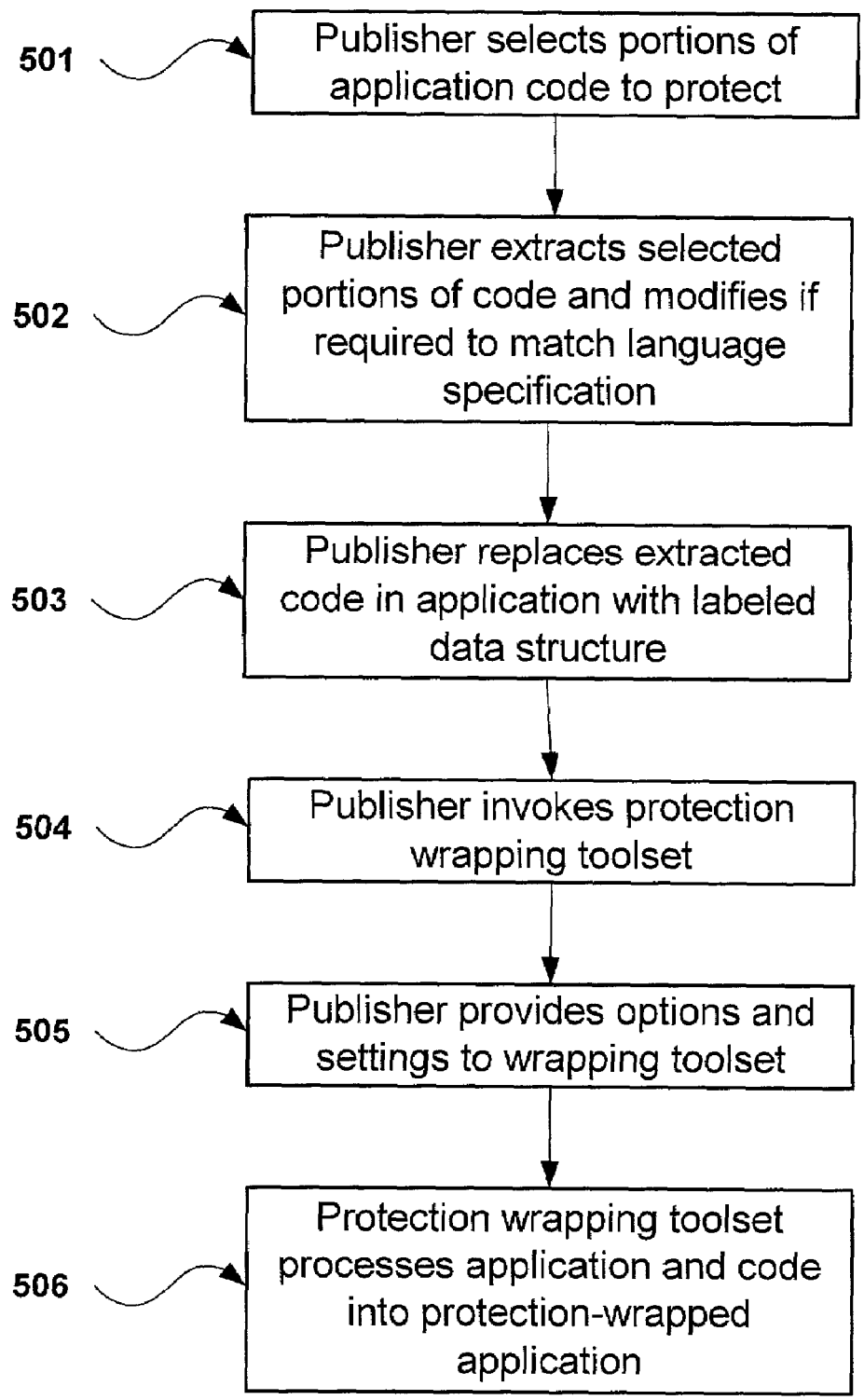
FIG. 5 is a flow diagram for processing the application for anti-piracy protection using the wrapping tool with an embedded toolset of the present invention.

Referring to FIG. 5, a flow diagram for processing the application for anti-piracy protection using the wrapping tool with an embedded toolset of the present invention is shown. In step 501, the publisher selects portions of application code to protect with the present invention. In step 502, the selected portions of code are removed from the application, and modified if required by the compiler 310 language specification. In step 503, the publisher replaces the removed application code portions with a labeled data structure. This structure is described above in relation to FIG. 2, step 206. The data structure contains the interpreter call and a symbol identifying the byte code that replaces the module. The data structure label must be exported in some way such that the protection-wrapping tool can locate the data structure in the executable application. Techniques for this are well known to one of ordinary skill in the art, and will not be discussed in more detail herein.

In step 504, the publisher invokes the protection-wrapping toolset. As part of the operation and use of the toolset 400, the publisher provides options and settings in step 505, including identifying the location of the removed code portions. The location of the inserted data structures in the application executable can be automatically located by the toolset by a number of means. In the preferred embodiment, a naming convention is used for symbols, and the location of the symbols is done simply by string comparison of symbol names. Likewise, the modified code portions also are identifiable and can be automatically related to the embedded data structure symbols using either file name conventions or by using a label statement of some sort in each modified code portion, for example.

Next, in step 506, the protection-wrapping toolset 400 begins the process of using the protection method of the present invention. This step is only part of the protection process of toolset 400. In this step, the toolset 400 invokes the compiler 310 to compile into byte codes all identified application code portions, and embeds the resulting byte codes, along with the interpreter 321 and library 322 into the application at identified locations, or at the end of the application. The related data structures inserted in step 503 by the publisher are located, and the reference to the interpreter and byte code module in each data structure is resolved appropriately for the target operating system. Ideally, all symbols used to locate the data structures are removed, as an additional step to prevent easy location by a hacker. In the preferred embodiment, the data structure may also be loaded with random information by the toolset 400 in order to remove any possibility of location by a pattern-matching search.

Figure 6:
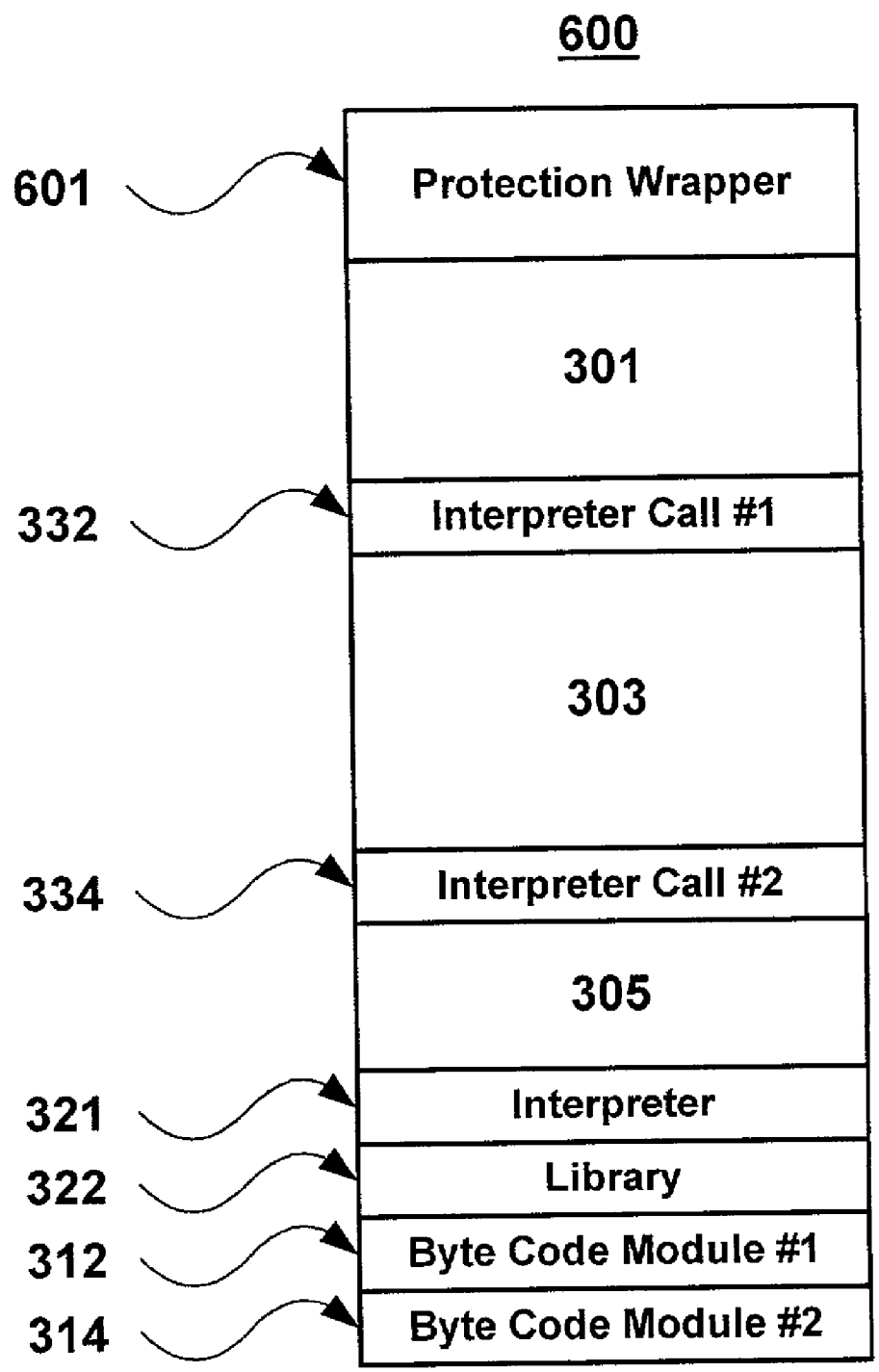
FIG. 6 is a block diagram of the wrapped and protected application.

Referring now to FIG. 6, a block diagram of the wrapped and protected application is shown. This application is formed in the same way as shown in FIG. 3, with the addition of the protection wrapper 601 at the beginning of the application. Note that the protection wrapping toolset 400 may also make other changes to the application (not shown), depending on other protection features selected by the publisher in step 505. This may include insertion of protection code in various places within the application, other than just at the beginning. Also, the interpreter 321, library 322, and byte code modules 312 and 314 may be located within the application at locations designated by the publisher.

The methods for applying the present invention described above all depend on a toolset and instructions provided to a publisher. The publisher then applies the toolset to his application for the purpose of creating a protected application. While this is the easiest means of providing the functionality of the present invention, it is also the most easily hacked. A hacker can pose as a legitimate publisher, and get a copy of the toolset and instructions. Alternatively, an employee or consultant of a company owning a legal copy of the toolset may give a copy to a "friend" who also happens to be a hacker, or knows a hacker. The result is that the hacker can study the operation of the toolset, including having access to all of the option settings. By studying the operation of the toolset as it protects the application, the hacker can learn enough to make it much easier for him to defeat the protection on any given application using the protection methods.

Thus, according to a further aspect of the present invention, the toolset is preferably provided on a secure server or set of servers, and the application is prepared and uploaded by the developer to the server for protection processing. By removing the toolset from the public domain, the hacker cannot study the protection process.

Unfortunately, the hacker can get copies of the instructions for using the toolset in the same manner as described above. However, if carefully done, the instructions will not assist the hacker in his attempts to break the protection features of an application using the present invention. Knowing the language specification does not provide useful information about the byte code interpreter, or how the application is built on the server. In fact, the instructions do not even need to be definite on the process at all. The instructions must only describe what criteria to use in selecting code to be protected, and provide a language definition and sample data structure. The instructions provided to users preferably do not mention any details about the process of obfuscation used by the toolset By carefully limiting the content of the instructions, very little help is afforded the hacker by having access to a copy of the instructions.

Figure 7:
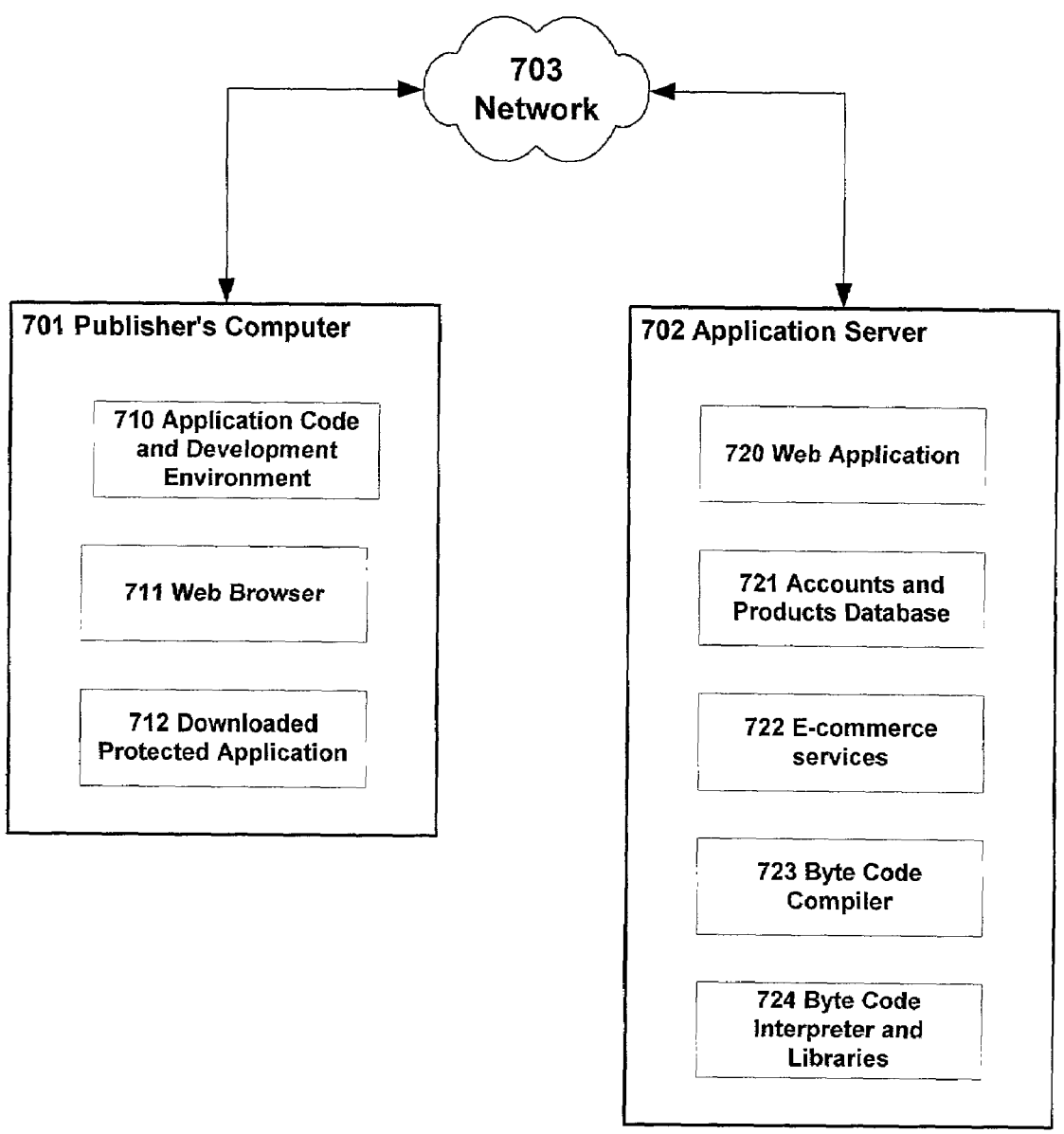
FIG. 7 is a block diagram of a server providing the toolset of the present invention.

Referring to FIG. 7, a block diagram of a server providing the toolset of the present invention is shown. The publisher's computer 701 is coupled to a network 703. The network 703 is also coupled to the application server 702. The network can be the Internet, local area network, or any other type of network, including a dedicated line between computer 701 and server 703. Virtual private network (VPN) technology can also be used over a public network to provide a high level of security, if required.

The publisher's computer 701 contains the application code and development environment 710 used to create the executable application code. Also included on computer 701 in the preferred embodiment is a web browser 711. This is the easiest means to provide user interaction between the server and the publisher, using standard HTTP (Hyper Text Transport Protocol) or HTTPS (secure HTTP) protocol. Other methods can also be used, such as a dedicated application running on computer 701 using a proprietary communications protocol with the server 702, for example. After processing on the server, the protected application 712 is downloaded to the publisher's computer 701. The process used to protect the application using a server is described in detail in conjunction with FIG. 8 below.

The application server 702 includes a web application 720. This application includes a home page, login pages, and other pages for the purpose of managing the process of setting up publisher accounts, receiving uploads from publishers, feature and options settings, and protection processing and downloading. Other pages may include account management, billing, history, statistics, and other functions required to provide a robust environment for the publisher. Facilitating the account management, an accounts and products database 721 is included on server 702. The database 721 not only contains account information for each publisher using the server 702, but also contains information such as history, revision numbers, and even copies of protected applications for each product the publisher protects using the server 102. Database 721 can also be implemented as a set of separate databases or files (not shown).

E-commerce services 722 are also included. This service is used for billing the customer for services provided, typically by use of credit card or bank transactions. Billing for services can include account setup fees, subscription service fees (such as a fee for a year of service), protection processing fees, and storage fees for maintaining backup copies of protected applications and historical copies created during development. Retaining copies of each version of the protected applications can facilitate customer service by the toolset and server provider. In the preferred embodiment, each protection processing is assigned a unique ID number (not shown). This number is provided to the publisher, and may also be embedded within the application for easy identification for customer support purposes.

Also contained on the server 702 is a copy of the byte code compiler 723 modified for automation in a server context. A copy of the interpreter and libraries 724 is also required. Note that if the server 702 is required to support the creation of protected applications for multiple target operating systems, such as LINUX, MICROSOFT WINDOWS, and MACINTOSH, for example, then there must be multiple copies of the interpreter and libraries 724 for each target processor and OS. Likewise, the instructions for preparing the application for processing, and the format of the data structure required for insertion in the application may be dependent on the target OS and processor instruction set. However, only one copy of the compiler 723 is required, since the byte codes are machine independent.

Figure 8:
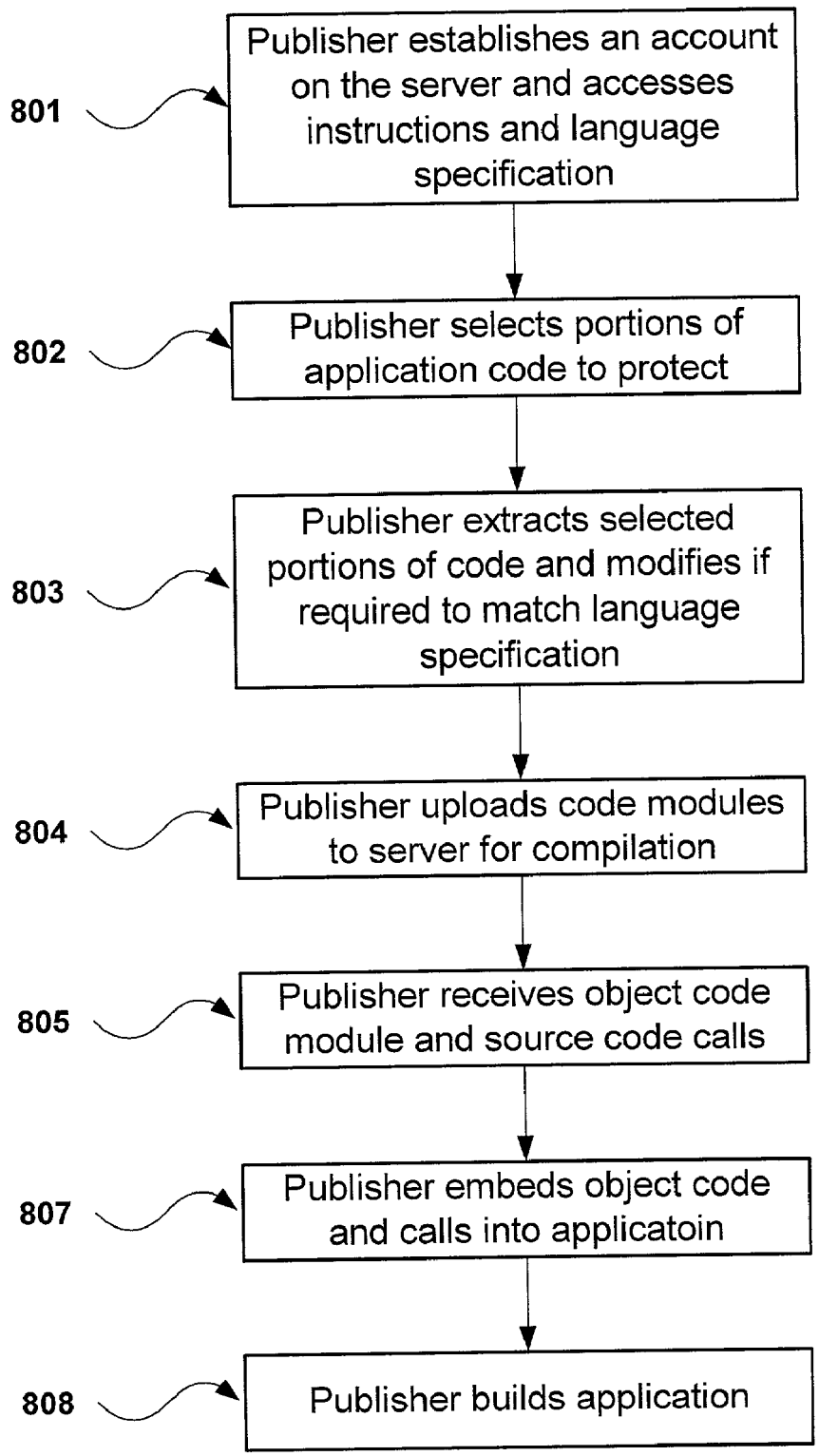
FIG. 8 is a flow diagram for protecting an application using a server.

Referring now to FIG. 8, a flow diagram for protecting an application using a server is shown. In step 801, the publisher establishes an account on the server 702. This may include some process of identity checking, such as the exchange of information using a digital certificate issued to the publisher by a certificate authority. This is important to reduce or eliminate the possibility of creating an account for a hacker masquerading as a legitimate software publisher. Certificates are well known to one of ordinary skill in the art, and will not be described in detail herein. Additional steps may be used, such as manual verification prior to allowing the account setup to complete. Manual intervention for new publisher customers allows the rejection of suspect customers, if desired.

Once the publisher has established an account on the server by using the web application 720 and a browser 711, the publisher has access to the language specification and instructions required to prepare the application for protection processing on the server. In step 802, following the provided instructions, the publisher selects portions of code from his application for protection by the present invention. In step 803, these selected portions are extracted from the application, and, if required by the language specification, are modified for processing by the compiler. In step 804, the publisher uploads the selected portions of code to the server according to the provided instructions. In order to protect the publisher, all transactions are typically performed using HTTPS, the secure Internet transfer protocol using 128-bit encryption. This is to prevent someone receiving copies of the publisher's work by monitoring the network traffic. Alternatively, VPN (Virtual Private Network) or other technology may be used to provide the encryption protection. When a dedicated, private line is used to connect the server 702 and publisher's computer 701, no encryption may be required.

Once received by the server application 720, the byte code compiler 723 compiles the modules under the direction of the server application 720. The resulting modules are combined with the interpreter and libraries 724 and returned to the publisher for embedding into his application in step 805. Additionally, data structures can be provided for insertion into the application where the portions of code were removed. Alternatively, source code examples can be provided, or instructions can be provided. In any case, in step 807, the publisher must insert the required data blocks at the locations of the removed code, and embed the combined byte code modules, interpreter and libraries 724 into his application, as instructed. Note that there is no requirement for the publisher to know what is contained in the combined module. The only obvious fact will be that a call is made to the code in the combined module for each of the removed portions of code. Finally, in step 808, the publisher builds the final, protected application using the application development tools of his choosing.

This server-based method described above not only provides obfuscation of program execution of the selected portions of application code, but also obscures the method of obfuscation as well, by hiding the details behind the server firewall. A higher level of automation for the protection process is also possible, and will be described below in conjunction with FIG. 10 below.

Figure 9:
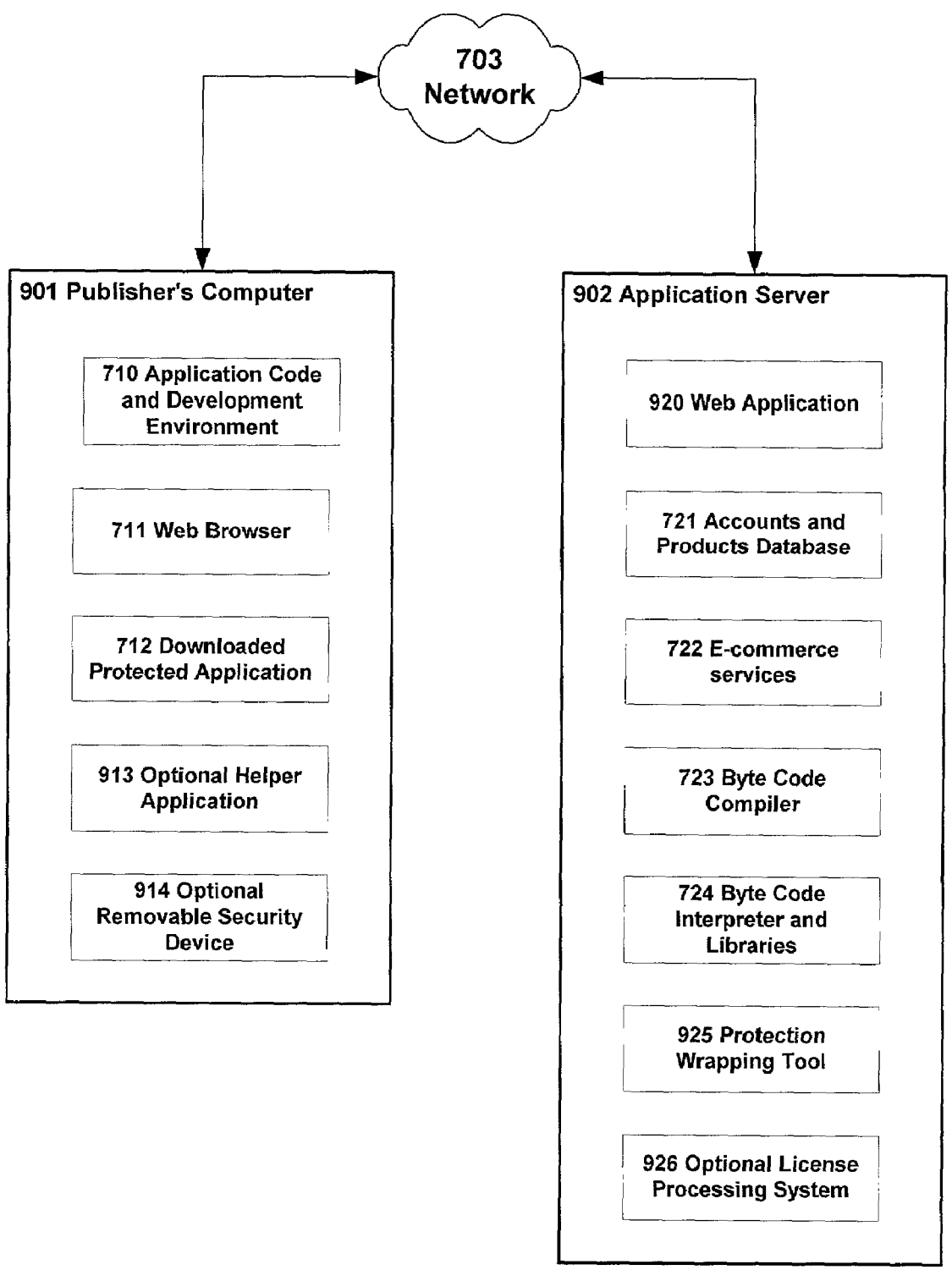
FIG. 9 is a block diagram of a server providing the toolset of the present invention embedded within an anti-piracy wrapping toolset.

Referring now to FIG. 9, a block diagram of a server 902 providing the toolset of the present invention embedded within an anti-piracy wrapping toolset is shown. The primary additional element required to support the additional functionality of the protection wrapper is the protection-wrapping tool 925, along with a somewhat different web application 920 incorporating any required additional capabilities related to the wrapping tool. For example, many additional settings and options may be available with the wrapping tool, and thus additional pages and functions of the web application will be required to support the additional features. Likewise, the database 721 may require additional fields to contain additional information.

The protection-wrapping tool 925 may include within it the compiler 723, the interpreter and libraries 724, rather than them being separate components, as shown in FIG. 9. Additional optional components include a license processing system 926 on the application server 902, a helper application 913 on the publisher's computer 901, and a removable security device 914, plugged into the publisher's computer 901.

The optional license processing system 926 is responsible for receiving license requests from the protection wrapper when required during normal use of the downloaded application 712. The license processing system 926, typically in conjunction with the web application 920 and the e-commerce system 722 creates a license for using the software application and returns it to the protection wrapper making the request. The license typically includes license terms, which are interpreted by the protection wrapper, and are used to control the use of the protected application.

The optional helper application 913 and removable security device 914 provide the ability for the license information to be loaded into a portable device. This allows a license to be carried by the user from one machine to another, and is very useful when a single person uses multiple machines in various locations. The helper application 913 performs the required interface between the web browser 711 and the removable security device 914, enabling a direct connection between the server 902 and security device 914 over standard HTTP protocols. The operation and use of helper applications 913 with web browsers 711 is well known by one of ordinary skill in the art, and will not be described in detail herein.

Figure 10:
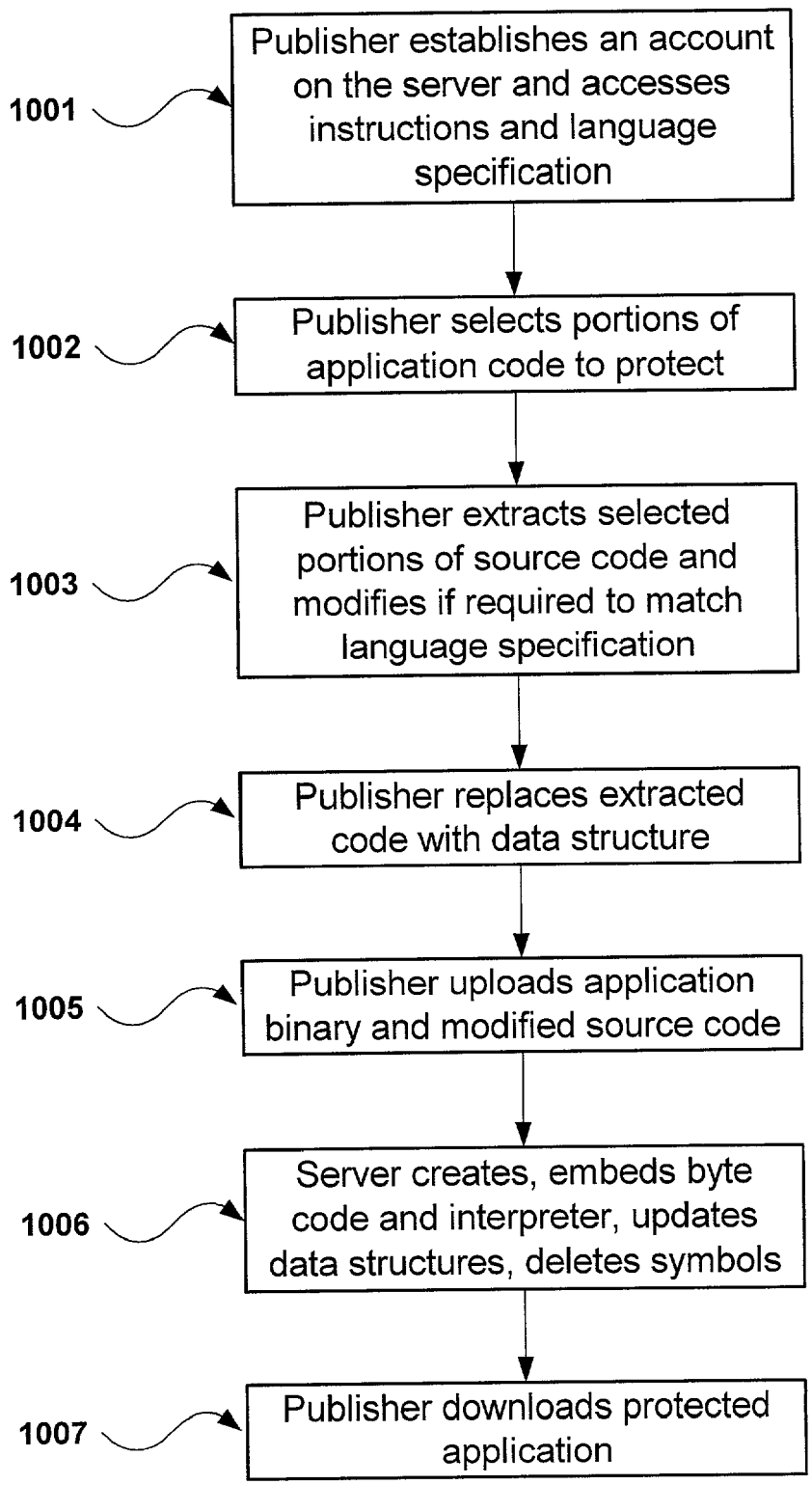
FIG. 10 is a flow diagram for protecting an application using a server in a more automated and secure manner.

Referring now to FIG. 10, a flow diagram for protecting an application using a server in a more automated and secure manner is shown. This process can be used for either protection with the present invention or with protection with the present invention embedded into a protection wrapper. Additional steps in the process may be required in the latter case, depending on the requirements of the protection wrapper (not shown). In step 1001, the publisher establishes an account on the server 902. This may include some process of identity checking, as described above in conjunction with FIG. 7. Once the publisher has established an account on the server 902 by using the web application 920 and a browser 711, the publisher has access to the language specification and instructions required to prepare the application for protection processing on the server 902. In step 1002, following the provided instructions, the publisher selects portions of code from his application for protection by the present invention. In step 1003, these selected portions are extracted from the application, and, if required by the language specification, are modified for processing by the compiler, and modified as instructed for uploading to the server 902.

In the preferred embodiment, as little as possible of the details on how the protection system works is provided in the instructions. To support this, only a data structure is required to replace the removed code portions—one data structure for each portion. This data structure is basically empty space reserved for use by the server, including identifiable labels to enable the server to locate the data structures. Methods for identifying the location of the data structures are well known by one of ordinary skill in the art, and will not be described herein. In step 1004, the publisher replaces the removed code portions with the specified data structures.

In step 1005, the publisher uploads the prepared executable form of the application, which includes within it the required data structures. Along with the executable, the selected and modified portions of source code are also uploaded. All uploads are carried out using secure HTTPS transfers in the preferred embodiment. Other secure protocols may be used, such as VPN or a direct connection.

In step 1006, the server 902 compiles the selected portions of code into byte code modules 312 and 314, and embeds the modules 312 and 314, the interpreter 321, and the library 322 in the application, typically at the end. If a protection wrapper is also being added, that code may also be added at the beginning, or may be added at several locations within the application. Next, the server 902 locates the data structures using the symbols defined in the instructions to the publisher, and places appropriate data within them to effect a call to the interpreter to interpret the byte code representing the code removed from that location. Thus, a reference to the byte code module 312 or 314 is required in the data. Additional information may be placed in the data structure to randomize the data contents in order to increase the difficulty in locating the data structure using a pattern-matching search. After populating the data structures, the symbol information is removed to hide the location of the data structures.

Once this process has been completed, the protected application is ready for download to the publisher. In step 1007, the publisher downloads the protected application 712 for testing and delivery to customers.

Figure 11:
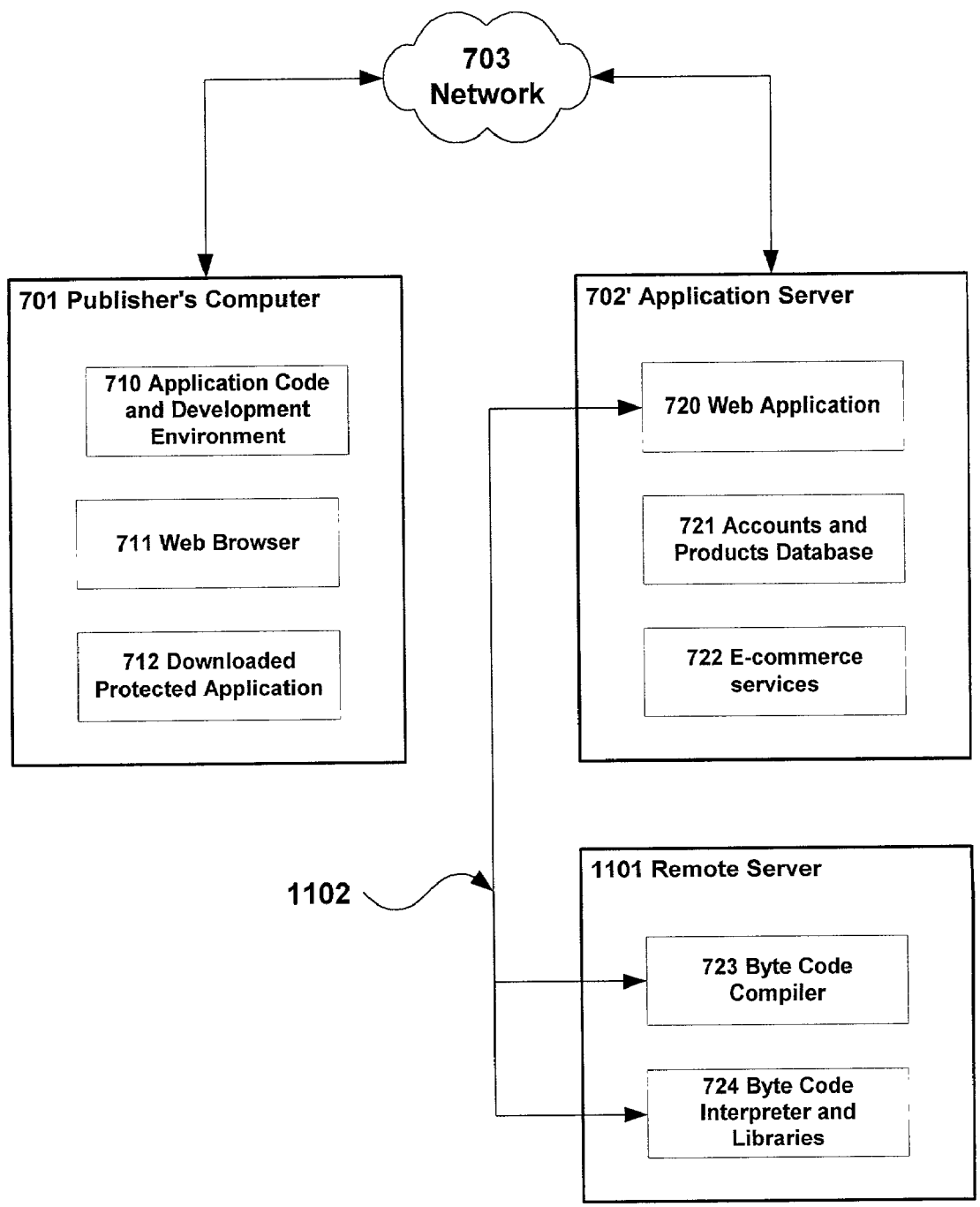
FIG. 11 is a block diagram of a server providing the toolset of the present invention using a remote secure server.

Referring now to FIG. 11, a block diagram of a server providing the toolset of the present invention using a remote secure server is shown. The elements of the present invention that are most sensitive and useful for hackers can be placed on a separate remote server 1101, accessible over a private network 1102, or a Virtual Private Network (VPN) 1102. The access to the remote server 1102 can be severely restricted, to reduce likelihood of hacker access. In the preferred embodiment, remote server 1102 also would be located in a secure environment, such as behind a firewall in a secure and locked facility. In this configuration, application server 720' does not contain the sensitive components, but rather makes function calls to the remote server 1101 via the network 1102. Therefore, if application server 720' is hacked successfully, the sensitive files cannot be retrieved by the hackers. The separation of server functions shown in FIG. 11 can also be applied equally effectively when the present invention is embedded in a protection-wrapping toolset (not shown). In this case, the protection-wrapping software function would also be placed at the remote server 1101.

An additional aspect of the present invention is to further obscure a determined hacker by creating a different version of the library and interpreter for each publisher or even each product. This would prevent transferring the knowledge gained by hacking one application from being used to hack another application, where both applications are using the present invention, but have different "versions" of the interpreter and libraries.

Figure 12:
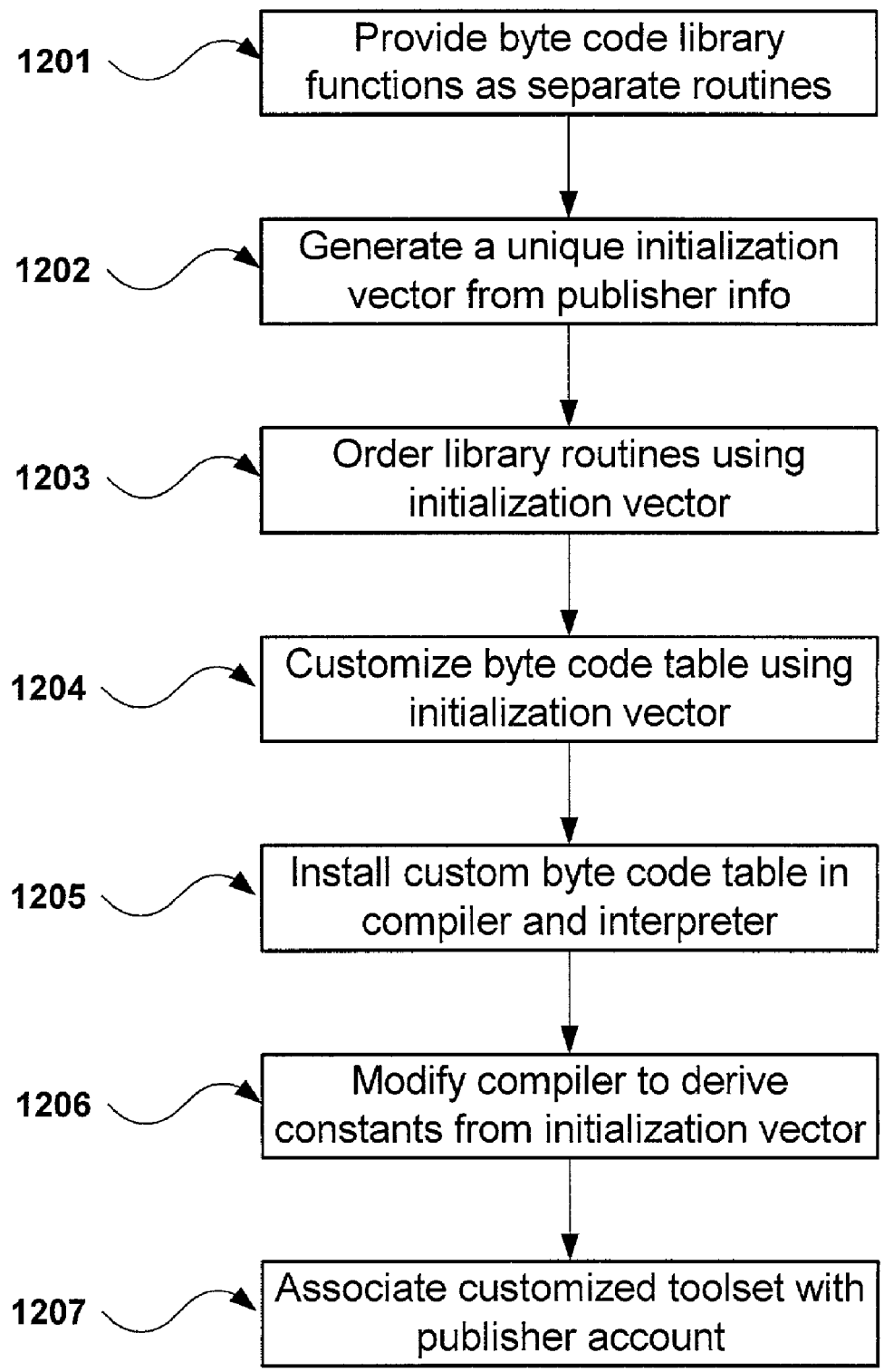
FIG. 12 is a flow diagram of one method for customizing the toolset of the present invention with a unique initialization vector.
Figure 13A:
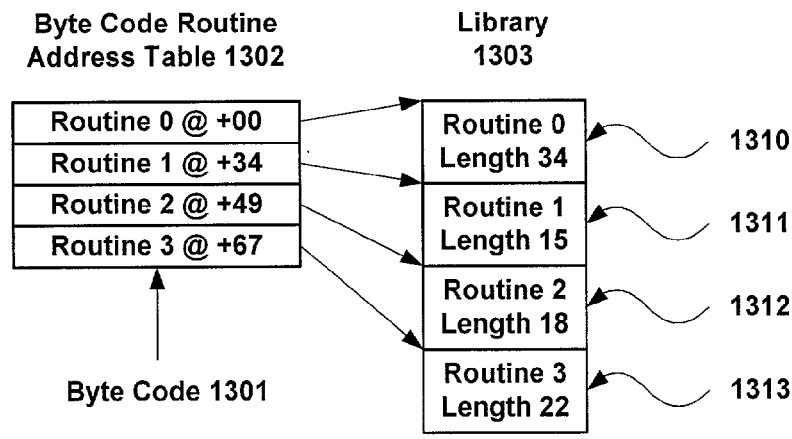
FIGS. 13a–c are block diagram showing the customization of the interpreter, library, and compiler for a specific publisher or product.

Referring now to FIG. 12, a flow diagram of one method for customizing the toolset of the present invention with a unique initialization vector is shown, for the purpose of creating a unique version of the toolset for each publisher or even for each publisher application. By making a unique version of the toolset in this way, any information acquired by hacking one application, such as the meaning of byte codes, will be useless for hacking another application, thereby increasing the difficulty of successfully hacking any given application. The various steps of this process will be described in conjunction with FIGS. 13a, 13b, and 13c, block diagrams showing the customization of the interpreter, library, and compiler for a specific publisher or product. In step 1201, the individual functions in the interpreter library are separated and packaged so that the server can dynamically build the library. In effect, rather than supplying the library as a single file, each function in the library is supplied as a separate file, such that a unique library file can be constructed from the functions by combining them in random order. There may be hundreds of small routines within the library for a typical language specification. These library routines 1303 are shown in FIG. 13a. In FIG. 13a, only four library routines 1303 are shown, to simplify the example. Note that the library routines 0, 1, 2, and 3 are ordered in ascending order. This initial order is arbitrary, but serves as a starting point for our description. Also note the lengths of each routine are different. A byte code address table 1302 is used to access the entry point of each library routine 1303. This table contains the offsets from the starting address of the library 1303. Thus, in order to "execute" byte code 1301, the byte code value is used as an index into byte code address table 1302 to retrieve the address offset. For example, if the byte code 1301 had a value of 2, the value 48 would be retrieved from table 1302. This value would be added to the starting address of the library 1303. The result of this address calculation is the entry point into routine 2 in library 1303. There are many different ways of resolving addresses for byte codes that are well known to one of ordinary skill in the art, and will not be described herein. This single approach will be used as an example of the technique of the present invention.

In step 1202, a unique initialization vector is created from publisher information, such as name, address, telephone number, etc. This can be extended to include product name as well, whereby the toolset is different for each product rather than just for each publisher. A unique initialization vector can be generated in many ways, including applying a message digest algorithm to the data collected from the publisher. Message digest algorithms are well known by one of ordinary skill in the art, and thus will not be described herein.

Figure 13B:
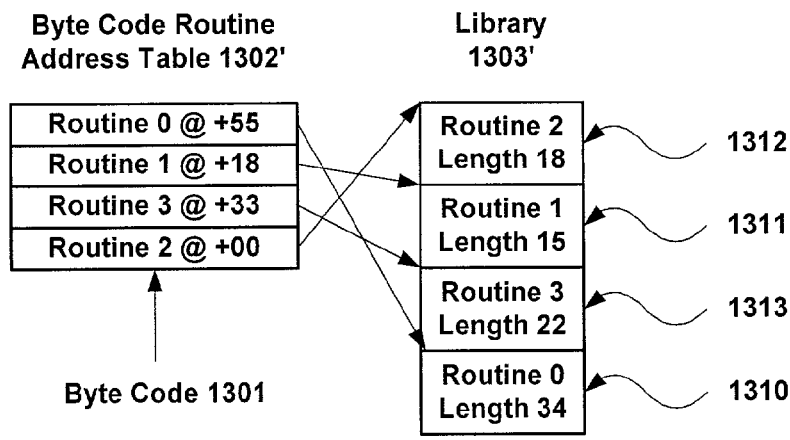

In step 1203, the ordering of the library routines is generated using the initialization vector. There are many methods for doing this. One method is to use a maximal sequence generator with the part or the entire initialization vector as the seed. Maximal sequence generators and seeds are well known by one of ordinary skill in the art, and will not be discussed herein. FIG. 13b depicts this action, showing the reordering of the library 1303' and the subsequent change in offset values in address table 1302'. Note that the byte code 1301 still acts as an index into the address table 1302': the reordering only affects the library routines and address offsets.

Figure 13C:
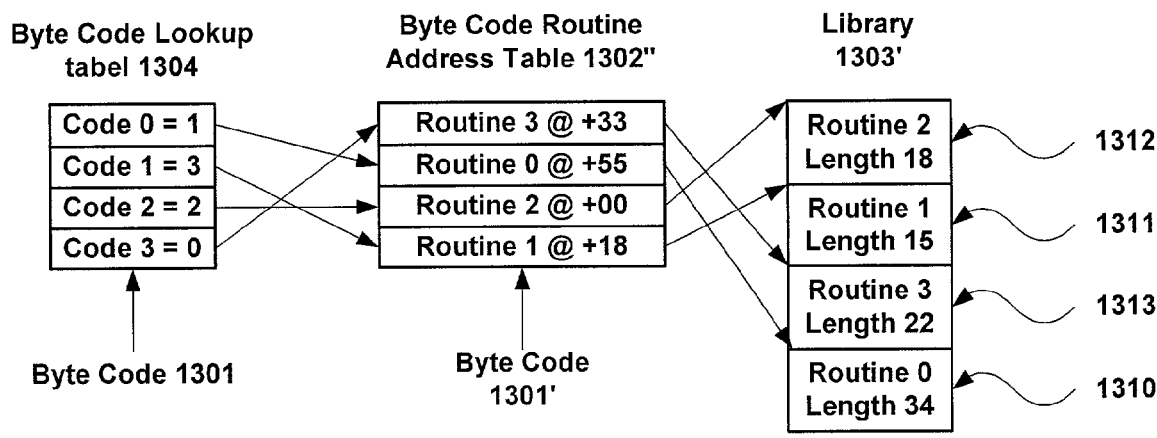

Referring back to FIG. 12, in step 1204, the byte code table is built using the new library ordering. This table essentially translates a given byte code into an entry address in the library. Once built, the table is then reordered, again using another part of the initialization vector. The same technique can be used here as was used in step 1203, or a different algorithm can be applied. FIG. 13c depicts this action, showing the reordering of the address table 1302". The byte code 1301 can no longer be used as an index to the address table. Thus, an additional table, a byte code lookup table 1304 must be created. This table converts byte code 1302 to a new byte code value 1302' that will work correctly with address table 1302". Note that table 1304 is not used to translate byte codes during interpreter execution. Rather, it is used to convert byte codes during the compile process, thus rendering the byte code module unique for a given publisher or application, depending on the value of the initialization vector. For example, if the compiler generates a byte code 1301 to access routine 3, the code must be converted from a 3 to a value of 0, using the lookup table 1304. The byte code 1301' value 0 is stored in the byte code module. When it is time for the interpreter to "execute" the function of the byte code, the byte code 1301' value is used as an index to access the address table 1302", retrieving the correct offset value 33.

Referring back to FIG. 12, in step 1205, the reordered address table 1302" is placed in the interpreter, and the byte code lookup table 1304 is placed in the compiler, resulting in unique byte code values being generated by the compiler, but still resulting in the correct function n the library being used to implement the byte code. In other words, the logic process of the resulting byte codes generated by the compiler has not been changed: only the actual byte code values have changed. Likewise, the address offsets within the library for any given function has also changed. This is a two-level modification, thus obfuscating the operation of the interpreter from one publisher or application to the next. Note that the byte code remapping from table 1304 could also be accomplished with a compiler post-processor.

In step 1206, an additional obfuscation step is taken by modifying the compiler constant function so that all constants used by the portions of application code are created dynamically from the initialization vector using various mathematical operations. In this case, the initialization vector is embedded in the library, along with the routine for mathematically deriving the appropriate constants. For a simple example, assume the mathematical function used to derive constants is the exclusive OR logical function. The constant value is exclusive-or'ed with a selected portion of the initialization vector, resulting in a modified value. This value is provided by the compiler as a constant within the byte code output. When the interpreter interprets the byte code, and loads the modified constant, the value is again exclusive-or'ed with the selected portion of the initialization vector, thus recovering the original constant for use in the program computations. This is a very simple example. Much more complex methods can be employed to further obscure the operation of the byte codes.

Finally, in step 1207, the customized compiler, interpreter, and library are associated with the publisher's account, for use in generating protected applications. If the customization process is application based rather than publisher based, then each time the publisher works on a new application, this process is repeated. In that case, each publisher account will have multiple customized versions of the compiler, interpreter, and library associated with it, one for each product from the publisher.

Note that FIG. 12 includes three different techniques, effectively giving a triple level customization. Other embodiments can include fewer or more such techniques. However, the underlying concept of using the initialization vector to uniquely customize the compiler, interpreter, and library is disclosed.

A further aspect of the present invention is the use of encryption to further obscure the byte codes. In one embodiment, the encryption of the byte codes takes place on the server. In another embodiment, the encryption takes place on the publisher's computer. In either case, an encryption key is used. This encryption key can be unique to the product, or can be the private key from the publisher, for example.

When the interpreter is invoked to interpret a byte code module, the first chore is to decrypt the module, using a copy of the public key associated with the private key used to encrypt. Alternatively, the public key can be extracted from a digitally signed license generated for the purpose of controlling the use of the application. Public and private key encryption is well known to one of ordinary skill in the art, and will not be discussed herein.

In another embodiment, a simpler reversible mathematical function can be used rather than the very complex encryption/decryption algorithms described above. For example, the byte codes can be exclusive-or'ed with the initialization vector. In this case, the initialization vector can be repeated over and over to match the length of the byte code program. When the interpreter runs, it either must repeat the exclusive-or function against the initialization vector prior to using the byte codes, or must apply the exclusive-or function on each byte code and constant as it is used. This can be done by using the offset from the first byte in the byte code module, and based on the offset into the module, selecting the correct byte in the initialization vector on which to apply the exclusive-or. Of course more complex randomization schemes can be applied to even further obfuscate the operation of the module.

The present invention has been described in accordance with the embodiments shown, and one of ordinary skill in the art will readily recognize that there could be variations to the embodiments, and any variations would be within the spirit and scope of the present invention.

What is claimed is:

1. A method for providing anti-piracy protection for a software application on a server, comprising:
   providing a language specification for a programming language, a library to implement the language, a compiler to compile the language into byte codes, and an interpreter to execute the byte codes using the library;
   providing the language specification and instructions to a software publisher with instructions for instructing the software publisher on how to select portions of code from the application to be protected, and how to prepare the selected portions of code and the application for processing on a server, including instructing the publisher to create data structures at respective locations where the selected portions of code were taken from the application;
   providing the server with the compiler, library, interpreter, and a server application for receiving the software application to be protected and the prepared selected portions of code from the publisher, wherein the server application protects the software application by:
      compiling the selected portions of code into byte codes using the compiler,
      embedding the byte codes generated by the compiler in the application, and replacing the data structures with interpreter calls to invoke interpretation of appropriate byte code modules representing the removed portions of code, whereby the application operates correctly with obfuscated portions of code running on the interpreter, and
      embedding the library and interpreter in the application to support run-time interpretation of the compiled byte codes, thereby obfuscating the selected segments.

2. The method of claim 1 further including removing any remaining location information used to locate the data structures.

3. The method of claim 1 further including storing random data within the data structures to render the data structures more difficult to locate.

4. A method for providing anti-piracy protection for a software application, wherein the software application is written in a standard computer language and compiled into a standard instruction set, comprising:

selecting portions of code from the application to be obscured;

processing the selected portions of application source code with a software tool to generate code comprising a non-standard instruction set, and replacing the selected portions of code with the generated code, thereby increasing difficulty of understanding the execution flow of the selected portions of the application;

providing the software tool for processing the selected portions of application source code on a server, and providing the software tool in the form of a byte code compiler and an interpreter to interpret byte codes generated by the byte code compiler at run-time; and wherein a publisher is instructed to create data structures where the selected portions of code were taken from the application, and on the server, the data structures are replaced with interpreter calls to invoke interpretation of appropriate byte code modules representing the removed portions of code, whereby the application operates correctly with obfuscated portions of code running on the interpreter.

5. The method of claim 4 further including removing any remaining location information used to locate the data structures.

6. The method of claim 4 further including storing random data within the data structures to render the data structures more difficult to locate.

7. A method for providing anti-piracy protection for a software application, wherein the software application is written in a standard computer language and compiled into a standard instruction set, comprising:

selecting portions of code from the application to be obscured;

processing the selected portions of application source code with a software tool to generate code comprising a non-standard instruction set, and replacing the selected portions of code with the generated code, thereby increasing difficulty of understanding the execution flow of the selected portions of the application;

providing the software tool in the form of a byte code compiler, and providing an interpreter to execute the byte codes generated by the byte code compiler at run time; and wherein a publisher is instructed to create data structures where the selected portions of code were taken from the application, and on a server, the data structures are replaced with interpreter calls to invoke interpretation of appropriate byte code modules representing the removed portions of code, whereby the application operates correctly with obfuscated portions of code running on the interpreter.

8. The method of claim 7 further including removing any remaining location information used to locate the data structures.

9. The method of claim 7 further including storing random data within the data structures to render the data structures more difficult to locate.

* * * * *